United States Patent [19]

Norsworthy

[11] Patent Number: 5,221,158

[45] Date of Patent: Jun. 22, 1993

[54] IRRIGATION AND DRAINAGE METHOD AND APPARATUS

[75] Inventor: John A. Norsworthy, Gloucester, Canada

[73] Assignee: Unique-Quality Products, Inc., Alberta, Canada

[21] Appl. No.: 811,957

[22] Filed: Dec. 23, 1991

Related U.S. Application Data

[63] Continuation of Ser. No. 541,969, Jun. 22, 1990, abandoned.

[30] Foreign Application Priority Data

Apr. 19, 1990 [CA] Canada .................. 2.014.980

[51] Int. Cl.$^5$ ............................................. E02B 13/00
[52] U.S. Cl. ............................................. 405/43; 405/51
[58] Field of Search .......... 405/36, 37, 38–44, 405/51; 239/1

[56] References Cited

U.S. PATENT DOCUMENTS

| | | | |
|---|---|---|---|
| 2,362,747 | 11/1944 | Duke | 405/41 |
| 3,908,385 | 9/1975 | Daniel et al. | 405/37 |
| 4,023,506 | 5/1977 | Robey | 405/43 X |
| 4,065,926 | 1/1978 | Brandt | 405/36 |
| 4,117,685 | 10/1978 | Skaife | 405/36 |
| 4,180,348 | 12/1979 | Taylor | 405/39 |
| 4,317,539 | 3/1982 | Pollock | 405/41 X |
| 4,423,838 | 1/1984 | Dinur | 239/1 |
| 4,538,377 | 9/1985 | Thornton | 405/51 X |
| 4,685,827 | 8/1987 | Sibbel | 405/37 |
| 4,704,047 | 11/1987 | Oldfelt et al. | 405/37 |

Primary Examiner—Dennis L. Taylor
Assistant Examiner—John Ricci
Attorney, Agent, or Firm—Mason, Fenwick & Lawrence

[57] ABSTRACT

There is provided a new and useful irrigation and drainage method and apparatus, the apparatus comprising a pump for raising water via a well from a subsurface water table; a subsurface perforated piping network for distribution of water at a level between the level of the water table and the ground surface to create an artificial water table; and structure for connecting an outlet of the pump with an inlet of the piping network. Drainage piping may be provided connected to an outlet of the piping network.

14 Claims, 2 Drawing Sheets

IRRIGATION AND DRAINAGE METHOD AND APPARATUS

This application is a continuation of U.S. patent application Ser. No. 541,969, filed Jun. 22, 1990, now abandoned.

This application relates to subsurface irrigation and drainage systems.

BACKGROUND OF THE INVENTION

Irrigation and drainage systems have been known for thousands of years. Such systems have varied from extremely crude to highly complex. For example, the simple expedient of diverting water from a stream or other natural source to a system of surface channels has been practised for centuries. More recently, greater reliance has been placed on pumping and piping systems as key components of irrigation systems.

In many cases the irrigation systems are of a mobile type which are moved from place to place within a field or farm area for selective periodic irrigation.

The manner in which water is ultimately delivered by these systems also varies greatly. For example, sprinkler systems and drip systems are in widespread use.

Prior such systems have generally included aspects which are inherently inefficient. For example, very substantial amounts of water are frequently lost through evaporation from surface irrigation systems.

Mobile systems and other selective periodic systems tend to result in very uneven soil moisture conditions from time to time.

Just as a variety of irrigation systems have been utilized over many years to compensate for a lack of rainfall, drainage systems have taken many configurations to compensate for periodic excess water. For example, in many areas annual rainfall is concentrated in a short period of time and may during that time create problems which are as serious as the lack of water at other times.

Again, the systems utilized have varied from simple drainage ditches to more elaborate drainage tile systems.

These drainage systems have generally not been controllable.

An irrigation system has now been developed which offers advantages over those known to date, and the system includes in one aspect an integrated drainage system offering advantages over prior such systems.

PRIOR ART

Applicant is not aware of combined irrigation and drainage systems which have been utilized on a field scale. Such systems are known, for example, in flower pots and the like.

Izatt Canadian Patent 828,981, issued Dec. 9, 1969, is in effect a large scale one of these flower pot systems. An excavation is lined with plastic to form the "pot" and selected growth media inserted. The whole is then irrigated or drained as required.

SUMMARY OF THE INVENTION

There is provided an irrigation system comprising pumping means for raising water from a subsurface water table; a subsurface piping network for distribution of water at a level between the level of the water table and the ground surface to establish an artificial water table; and means for connecting an outlet of the pumping means with an inlet of the piping network.

In a further embodiment of the invention the system includes drainage piping operatively connected to an outlet end of the piping network and the drainage piping having valve means on an outlet end thereof.

In a further embodiment of the invention there is provided a method of irrigating an area comprising raising the level of a natural water table to a higher level.

In a further embodiment there is provided a combined method of selectively irrigating or draining an area comprising raising the level of a natural water table to create an artificial water table when moisture is required or draining water from an artificial water table when excess moisture is present.

GENERAL DESCRIPTION

The present invention is a subsurface seep irrigation system primarily for agricultural use. In a preferred embodiment the system also functions as a draining system.

It can be said in general that the components necessary to assemble the system are presently available.

A theory of operation of the system assumes that the land in association with which the system will be used has an adequate water table but that the water table is at too great a depth to provide nourishment for plant growth. Accordingly, the basic postulate of the invention is that the water table is in effect raised. Water is pumped from the natural water table and redistributed by a seep system at a level at which it will be available to nourish plants on the surface but at which level it is preferably below the frost line.

The system is envisaged as being primarily attractive in the context of small acreages in fairly dry locals.

In the drainage mode the system operates to drain off excess moisture which may have a deleterious effect on crops or soil.

The system is intended to be relatively very simple in operation such that, once installed, it will be very effective and will have very low maintenance costs.

Because of the nature of the system, it is preferably installed in relatively flat terrain free of large trees and heavy boulders. It is preferred that the terrain include a low area or a natural drainage area, such as a creek or ditch, in order to optimize use of the drainage mode of the system.

The primary components of the system comprise a pump and a subsurface piping network. In the preferred embodiment a small storage container or buffer reservoir is provided between the pump and the piping network and a larger storage reservoir might also be provided. The most preferred embodiment also includes drainage piping.

The pump is preferably wind driven; that is, is powered by a windmill. Very efficient and low maintenance windmills are available which have been extensively used for quite a number of years.

The piping system includes a solid pipe leading from the pump arrangement to the piping network. The piping network preferably comprises a series of parallel pipes typically set six to ten feet apart, depending on the fall and the soil type. The pipe is preferably made up of sections of different diameters such that the larger diameter piping is at the inlet end and the smaller diameter at the downstream end. Thus, for example, the inlet end of the piping network might have four inch diameter piping while the downstream end might have one and one half inch or less diameter. The system will utilize a plastic piping.

The transition from larger to smaller piping through the system is intended to maintain a relatively constant head throughout the system.

Irrigation takes place through perforations in the pipes forming the piping network. The perforations are such as to allow only a low flow seep type irrigation.

A small storage container buffer reservoir is preferably inserted at or above ground level between the pump and the piping system to provide for more uniform flow to the system. Flow into the system is by gravity. This requirement can be met in appropriate cases by utilizing a drinking trough for animals as the small reservoir, the trough having an overflow which feeds the irrigation system. Such a system provides a simple and effective means for maintaining a constant head.

In the most preferred case a substantial reservoir is provided for excess water. This reservoir can provide a number of advantages, the availability of water in quantity often being a problem in the farm situation. The water in the reservoir could be available to supplement domestic usage, for equipment cleaning, for firefighting and the like. Water could be fed from the large reservoir to the smaller one if needed.

As indicated above, the system is preferably gravity fed, and the small reservoir can be arranged at an appropriate height to provide the required head. For example, a typical head requirement might be in the area of eight to ten feet. If the piping system is buried at a level five feet below the ground surface to avoid frost, the overflow from the small reservoir could be placed three to five feet above ground.

It is frequently the case that water requirements are not adequately met by rainfall during dry seasons but excess water may be available in a rainy season or as a result of storms or snow melt runoff. In a number of these situations a drainage system is a substantial asset. In its preferred configuration the present system includes a drainage mode. That mode can be arranged by providing a collector pipe at the outlet or downstream end of the piping network and providing an outlet for the collector pipe to a low area, stream or the like.

It is not intended to suggest that the system is a flood prevention system. No such system would be capable of coping with substantial flooding. Rather, the system will contribute in a very substantial way to generally improved soil moisture conditions and healthier plant growth. This will in turn contribute to reduced erosion and the like flood-related problems.

The collector pipe is provided with valve means. Thus, when it is desired to utilize the system for drainage, the inlet is shut off by furling the windmill or by simply operating a valve provided for the purpose. At the same time the collector pipe valve is opened. The irrigation piping network then operates in reverse to allow water to drain into the piping network and hence to the collector pipe and out. The valving at the inlet end may allow for air venting into the system.

Such a system provides a set of advantages not heretofore available from piece meal systems. The system thus provides irrigation and drainage as well as water storage with the potential for supplying water for various farm needs over and above the irrigation. The particular seep irrigation system provides in effect a raising of the water table to provide moist earth which is very similar to that provided by a natural water table. These advantages are gained without the evaporation and transpiration losses frequently associated with irrigation systems. Finally, the system utilizes long tested components which are relatively inexpensive and require very low maintenance to thus produce a cost effective system of particular benefit in such smaller land areas as in ten to thirty acre hobby farms and the like and in small fruit orchards.

BRIEF DESCRIPTION OF THE DRAWINGS

In drawings which illustrate embodiments of the invention.

Figure 1:
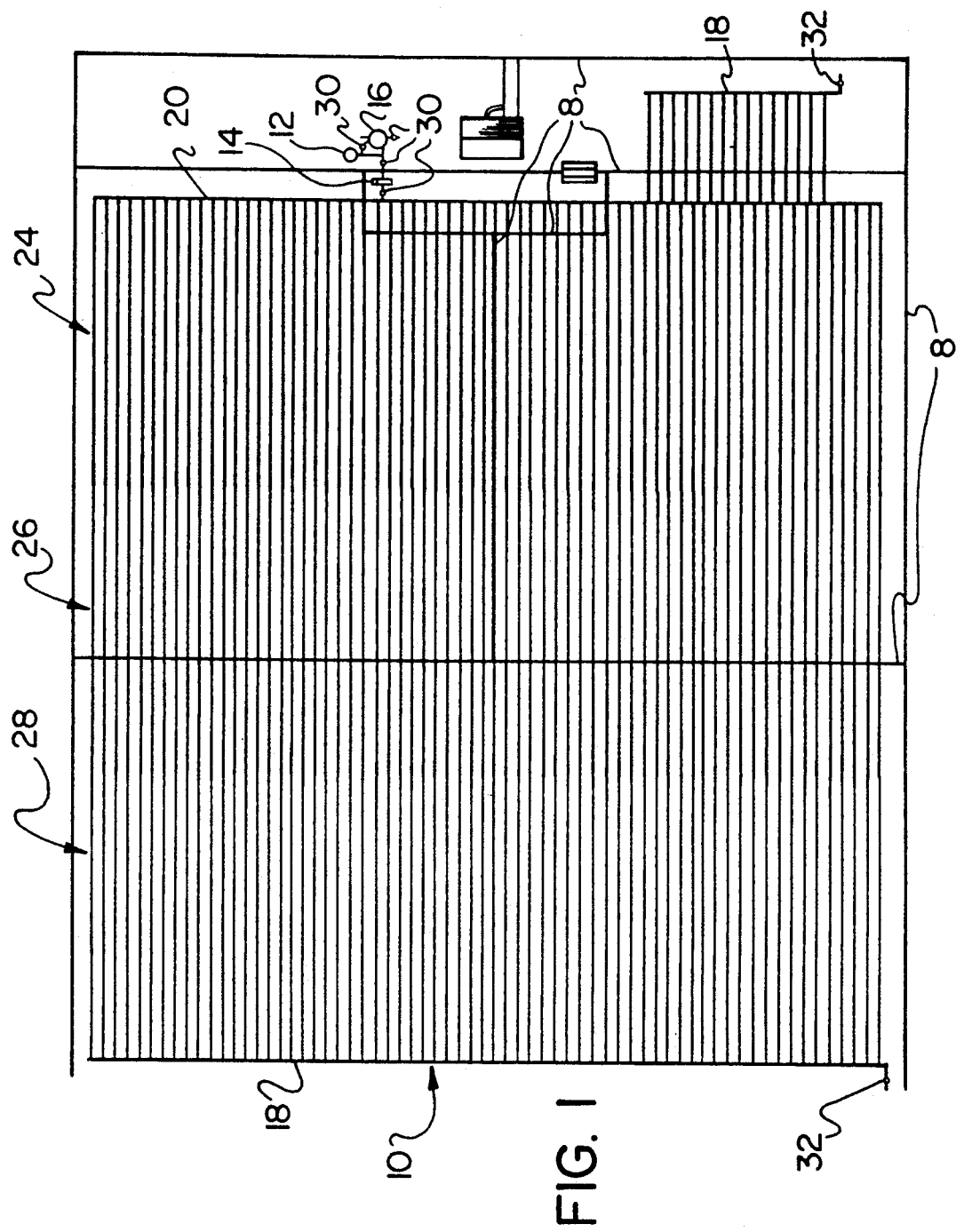
FIG. 1 is a top plan view of an installation according to the invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

FIG. 1 illustrates a general layout for the system on a small farm such as a twenty acre hobby farm.

The basic components of the system comprise the piping layout 10 and pump means 12. Pump means 12 is preferably a windmill. Interposed between pump means 12 and the piping layout 10 is a small buffer reservoir 14 which preferably feeds the piping layout 10 by means of a simple overflow.

The system preferably also includes a larger reservoir 16 for storage of excess water for multi-purpose use.

In the preferred embodiment the system includes drainage collector pipe 18 at the downstream end of piping layout 10.

It should be understood that the piping layout 10 will always be sub-surface, although shown in solid lines in the drawings for illustrative purposes.

The system is illustrated as including a series of fences 8, which may be arranged as desired to isolate stock pens, a garden and the like. It is an advantage of the system that, once installed at the preferred depth, there is no interference with normal farm operations. Thus, once the system is installed, fencing, ploughing, etc., can be done without concern for the system.

Figure 2:
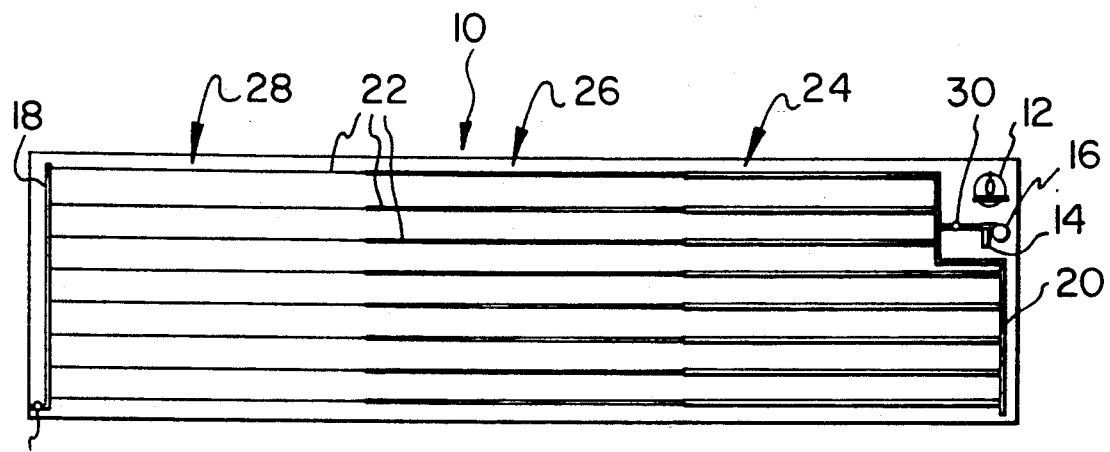
FIG. 2 illustrates a somewhat more detailed view of an installation such as that of FIG. 1.
Figure 3:
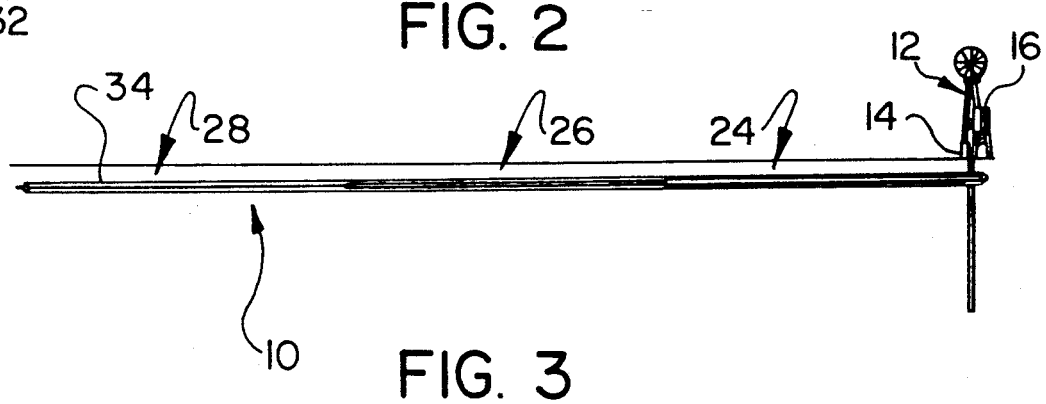
FIG. 3 is a side elevation of the embodiment of FIG. 2.
Figure 4:
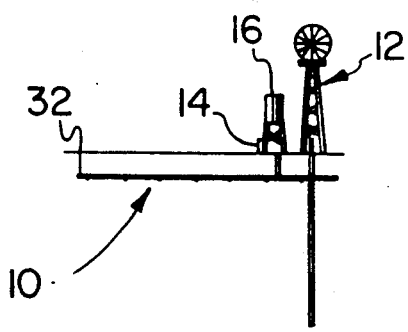
FIG. 4 is an end elevation of the embodiment of FIG. 2.
Figure 5:
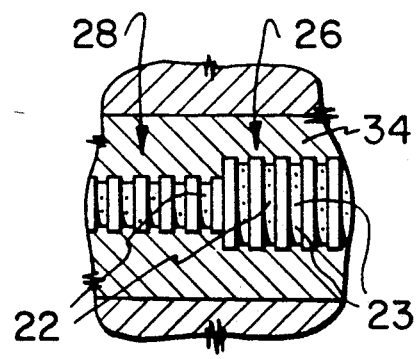
FIG. 5 illustrates a transition from a larger to a smaller perforated pipe in the embodiment of FIG. 2.

FIGS. 2 to 4 illustrate more detail of a typical piping layout 10. An inlet pipe 20 distributes water to a series of distribution pipes 22 which themselves terminate at the collector pipe 18. The distribution pipes 22 are comprised of sections having different diameters progressively between inlet pipe 20 and collector pipe 18. Thus, typically a first section 24 will comprise pipes of a first diameter; a second section 26 will comprise pipes of a second diameter; and the third section 28 will comprise pipes of a third diameter. FIG. 5 illustrates a transition between sections 26 and 28.

Figure 6:
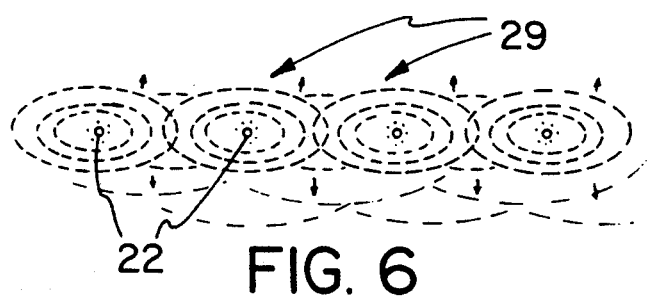
FIG. 6 illustrates a moisture dispersion profile produced by the system.

The distribution pipes 22 are perforated as at 23 to provide an essentially seeping type water distribution. FIG. 6 illustrates at 29 a typical moisture spread pattern obtained from the preferred piping arrangement.

In a typical case the inlet pipe 20 and collector pipe 18 may be of four inch diameter, the first section 24 of four inch diameter, the second section 26 of three inch diameter and the third section 28 of one and one half inch diameter pipe. FIG. 5 illustrates a transition between pipes 22 of sections 26 and 28. Clearly pipe diameters can be varied as required for proper distribution.

The piping layout 10 is buried below the ground surface and at a depth which is preferably below the frost line. In the usual case this will amount to a distance of five to eight feet below the surface.

The pump means is preferably driven by a wind power device or, as would commonly be said, by a windmill. The technology required for the utilization of the windmill and pumping means for the purpose required is known.

The distribution system is preferably gravity driven. The necessary head is preferably provided by utilizing a small surface storage container or buffer reservoir between the pumping means and the inlet pipe 20. In the hobby farm situation there will normally be at least some livestock present, and it is most convenient in this situation to utilize a watering trough for livestock as the small reservoir. The inlet pipe 20 can then be fed by an overflow from the trough which is arranged at a level to provide the required head.

Typically for a twenty acre area the required head might be in the order of eight to ten feet. Since the inlet pipe is buried at a depth of five to eight feet, the overflow would be provided between grade and three feet above the surface.

For a variety of reasons; for example, local weather conditions, an excess of water may be available from the pumping means at certain times. It is convenient and highly useful to provide a larger reservoir for storage of excess water. As will be known, there is frequently a requirement in the farm context for more water than might conveniently be available at any given time from the pumping system. Accordingly, the larger reservoir 16 is preferably imposed into the system, conveniently between the pumping means 12 and the smaller reservoir 14.

It is often the case that areas which are normally rather dry will suffer from heavy rainfall at certain times. This excess moisture can be very destructive for a number of reasons. Accordingly, the preferred configuration of the system provides for use as a drainage system at such times. For that purpose valves 30 are provided in an appropriate configuration for cutting off the flow of water to the inlet pipe 20. As will be appreciated, valves may be provided to achieve specific purposes. Thus, for example, the water supply may be diverted to the large reservoir or may be partially diverted and partially permitted to continue to flow to the small reservoir 16.

Valves 32 are provided to control flow of water from collector pipe 18 out of the piping layout 10.

Thus, where drainage is desired, the valves 30 are utilized to cut flow to inlet pipe 20 and valves 32 are opened to allow outlet flow from collector pipe 18. For this purpose it is highly preferred that the valves 32 be located in an area of the farm or acreage from which natural drainage can occur as, for example, near a stream.

The piping layout 10 will preferably be installed within a gravel seep bed 34 as shown in FIG. 5. Typically the piping may be placed on top of a four inch gravel bed and then covered by an additional four inches of gravel.

It will be appreciated that the operation of the system described is very economical and requires low maintenance once installed. That factor combined with the dual irrigation/drainage function provides substantial advantages in dryer regions.

Thus it is apparent that there has been provided in accordance with the invention a subsurface irrigation and drainage system that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention is:

1. A method of irrigating a field, comprising the steps of:
   providing a subsurface piping network comprising a series of spaced pipelines having a common inlet;
   locating the subsurface piping network beneath an area to be irrigated, and below conventional cultivation and fence post levels, with the pipelines in direct contact with the soil in said area;
   raising water from a subsurface natural water table to a surface storage container and feeding the piping network by gravity by overflow from the surface container; and
   distributing the water raised from the subsurface natural water table substantially uniformly in the area to be irrigated using the subsurface piping network, to form an artificial water table at a level above the natural water table.

2. The method of claim 1 comprising pumping excess water to a storage reservoir and connecting said reservoir to selectively feed water to said storage container.

3. The method of claim 1 comprising utilizing a windmill for driving said pumping step.

4. The system of claim 1 wherein said piping network is at a level below the frost line.

5. An irrigation system comprising:
   pumping means for raising water from a subsurface natural water table, said pumping means having an outlet;
   distribution means for distributing said water substantially uniformly in an area to be irrigated to form an artificial water table at a level above said natural water table, said distribution means comprising a subsurface piping network comprising a series of spaced pipelines in direct contact with the soil in said area and having a common inlet, said network being located beneath an area to be irrigated, and below conventional cultivation and fence post levels;
   means above the ground surface between said pumping means outlet and said common inlet for maintaining a desired pressure head on said piping network and comprising a storage container having an overflow outlet to said common inlet; and means for connecting said outlet of said pumping means with said means for maintaining a pressure head.

6. The system of claim 5 including a water reservoir between said pumping means outlet and said piping network inlet.

7. The system of claim 5 wherein said pump is wind powered.

8. The system of claim 5 wherein said piping network comprises sections of decreasing diameter between an inlet end and an outlet end.

9. The system of claim 8 wherein said piping network comprises perforated pipes.

10. The system of claim 9 wherein the size of said perforations is chosen to provide seepage discharge at a preselected pressure head.

11. The system of claim 5 wherein the piping network is at a depth about five to seven feet below the ground surface.

12. An irrigation and drainage system comprising:
   pumping means for raising water from a subsurface natural water table, said pumping means having an outlet;
   distribution means for distributing said water substantially uniformly in an area to be irrigated to form an artificial water table at a level above the natural water table, said distribution means comprising a subsurface piping network comprising a series of spaced pipelines in direct contact with the soil in said area and having a common inlet and an outlet, said network being located beneath an area to be irrigated, and below conventional cultivation and fence post levels;
   means for connecting said outlet of said pumping means with said common inlet of said spaced pipelines; and
   drainage piping operatively connected to said outlet of said piping network and said drainage piping having valve means on an outlet end thereof.

13. The system of claim 12 wherein said outlet end of said drainage piping is at a level at or below that of said piping network.

14. An irrigation and drainage system comprising:
   pumping means for raising water from a subsurface natural water table, said pumping means having an outlet;
   distribution means for distributing said water substantially uniformly in an area to be irrigated to form an artificial water table at a level above said natural water table, said distribution means comprising a subsurface piping network comprising a series of spaced pipelines in direct contact with the soil in said are and having a common inlet and an outlet, said network being located beneath an area to be irrigated, and below conventional cultivation and fence post levels;
   means for connecting said outlet of said pumping means with said common inlet of said spaced pipelines; and
   a drainage pipe connected to an outlet of said piping network for selectively draining excess moisture through said piping network.

* * * * *